United States Patent
Choi et al.

(10) Patent No.: US 9,911,322 B2
(45) Date of Patent: *Mar. 6, 2018

(54) ELECTRONIC APPARATUS, CONTROL METHOD THEREOF, REMOTE CONTROL APPARATUS, AND CONTROL METHOD THEREOF

(71) Applicant: SAMSUNG ELECTRONICS CO., LTD., Gyeonggi-do (KR)

(72) Inventors: Eun-seok Choi, Anyang-si (KR); Ho-june Yoo, Seoul (KR); Sang-on Choi, Suwon-si (KR); Byung-seok Soh, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/374,001

(22) Filed: Dec. 9, 2016

(65) Prior Publication Data

US 2017/0092118 A1 Mar. 30, 2017

Related U.S. Application Data

(63) Continuation of application No. 14/637,498, filed on Mar. 4, 2015, now Pat. No. 9,542,838, which is a
(Continued)

(30) Foreign Application Priority Data

Sep. 3, 2009 (KR) .................. 10-2009-0083204
Dec. 14, 2009 (KR) .................. 10-2009-0123955

(51) Int. Cl.
*H04N 5/44* (2011.01)
*G08C 17/02* (2006.01)
(Continued)

(52) U.S. Cl.
CPC ............ *G08C 17/02* (2013.01); *G06F 3/038* (2013.01); *G06F 3/0482* (2013.01);
(Continued)

(58) Field of Classification Search
CPC ........... H04N 5/4403; H04N 21/42222; H04N 2005/4428; H04N 21/47; H04N 5/44;
(Continued)

(56) References Cited

U.S. PATENT DOCUMENTS 5,554,980 A * 9/1996 Hashimoto ........... G06F 3/0304
340/12.55
5,926,168 A 7/1999 Fan
(Continued)

FOREIGN PATENT DOCUMENTS

KR 1020090043969 A 5/2009
KR 1020090066367 A 6/2009
(Continued)

OTHER PUBLICATIONS

Communication dated Apr. 24, 2015, issued by the Korean Intellectual Property office in counterpart Korean Application No. 10-2013-0111380.
(Continued)

*Primary Examiner* — Khai M Nguyen
(74) *Attorney, Agent, or Firm* — Sughrue Mion, PLLC

(57) ABSTRACT

An electronic apparatus, control method thereof, remote control apparatus that controls the electronic apparatus, and control method thereof. The remote control apparatus includes a communication unit which communicates with the electronic apparatus; a user input unit which receives a user button selection indicating an input button; a sensing unit which senses movement of the remote control apparatus; and a control unit which controls the communication unit to transmit information about the user button selection
(Continued)

to perform a function corresponding to the input button if the remote control apparatus is in a button input mode, and to transmit information about the movement of the remote control apparatus to the electronic apparatus to control the electronic apparatus by the movement if the remote control apparatus is in a motion recognition mode. Accordingly, controlling a game or a multimedia content is easier, and the user is provided with a new and interesting experience.

20 Claims, 11 Drawing Sheets

Related U.S. Application Data continuation of application No. 14/269,862, filed on May 5, 2014, now Pat. No. 8,988,271, which is a continuation of application No. 13/769,035, filed on Feb. 15, 2013, now Pat. No. 8,941,350, which is a continuation of application No. 12/694,867, filed on Jan. 27, 2010, now Pat. No. 8,432,305.

(51) Int. Cl.
*G06F 3/038* (2013.01)
*G06F 3/0482* (2013.01)
*H04N 21/422* (2011.01)

(52) U.S. Cl.
CPC ..... *H04N 5/4403* (2013.01); *H04N 21/42222* (2013.01); *G08C 2201/12* (2013.01); *G08C 2201/32* (2013.01); *H04N 2005/4412* (2013.01)

(58) Field of Classification Search
CPC .... H04N 5/44582; G08C 23/04; G08C 17/02; G06F 3/038; G06F 3/0482
USPC ............... 341/176; 345/156, 158; 348/734
See application file for complete search history.

(56) References Cited

U.S. PATENT DOCUMENTS

| | | | |
|---|---|---|---|
| 5,990,868 A | 11/1999 | Frederick | |
| 6,346,891 B1 | 2/2002 | Feinleib et al. | |
| 6,400,303 B2 | 6/2002 | Armstrong | |
| 7,102,616 B1 | 9/2006 | Sleator | |
| 7,123,180 B1 | 10/2006 | Daniell et al. | |
| 7,233,316 B2* | 6/2007 | Smith ............... | G06F 3/017 345/157 |
| 7,239,301 B2 | 7/2007 | Liberty et al. | |
| 7,679,601 B2 | 3/2010 | Chang et al. | |
| 7,746,324 B2 | 6/2010 | Gates et al. | |
| 7,852,255 B2* | 12/2010 | Rapisarda .......... | H04B 1/202 200/308 |
| 7,889,175 B2* | 2/2011 | Kryze ................. | G08C 17/02 345/156 |
| 7,931,535 B2 | 4/2011 | Ikeda et al. | |
| 8,106,748 B2 | 1/2012 | Lee | |
| 8,164,467 B2 | 4/2012 | Hirabayashi et al. | |
| 8,194,034 B2 | 6/2012 | Bucchieri | |
| 8,217,894 B2 | 7/2012 | Choi | |
| 8,902,155 B2* | 12/2014 | Kabasawa .......... | G01C 17/28 345/156 |
| 2004/0095317 A1 | 5/2004 | Zhang et al. | |
| 2005/0253806 A1 | 11/2005 | Liberty et al. | |
| 2009/0115723 A1 | 5/2009 | Henty | |
| 2010/0033424 A1 | 2/2010 | Kabasawa et al. | |

FOREIGN PATENT DOCUMENTS

| | | |
|---|---|---|
| WO | 2009008411 A1 | 1/2009 |
| WO | 2009/115723 A2 | 9/2009 |

OTHER PUBLICATIONS

Communication dated Jan. 8, 2014 issued by the Korean Intellectual Property Office in counterpart Korean Patent Application No. 10-2009-0123955.
Communication dated Jul. 24, 2014 issued by European Patent Office in counterpart European application No. 13186659.2.
Communication dated Oct. 6, 2015, issued by the Korean Intellectual Property Office in counterpart Korean Application No. 10-2013-0111380.
Communication dated Sep. 29, 2014 issued by Korean Intellectual Property Office in counterpart Korean application No. 10-2009-0123955.
Communication, dated Apr. 17, 2013, issued by the European Patent Office in counterpart European Patent Application No. 10167633.6.
Decision to refuse a European Patent Application dated Feb. 24, 2014 by the European Patent Office in counterpart European Application 10167633.6-1902.
European Search Report, dated Nov. 5, 2010, issued in Application No. 10167633.6.
Partial European Search Report dated Mar. 6, 2014 by the European Patent Office in counterpart European Application 13186659.2.
Search Report dated Apr. 17, 2012 by the European Patent Office in counterpart European Application No. 10167633.6.
Communication issued Jun. 12, 2017 by the European Patent Office in counterpart European Patent Application No. 13186659.2.

* cited by examiner

FIG. 6B
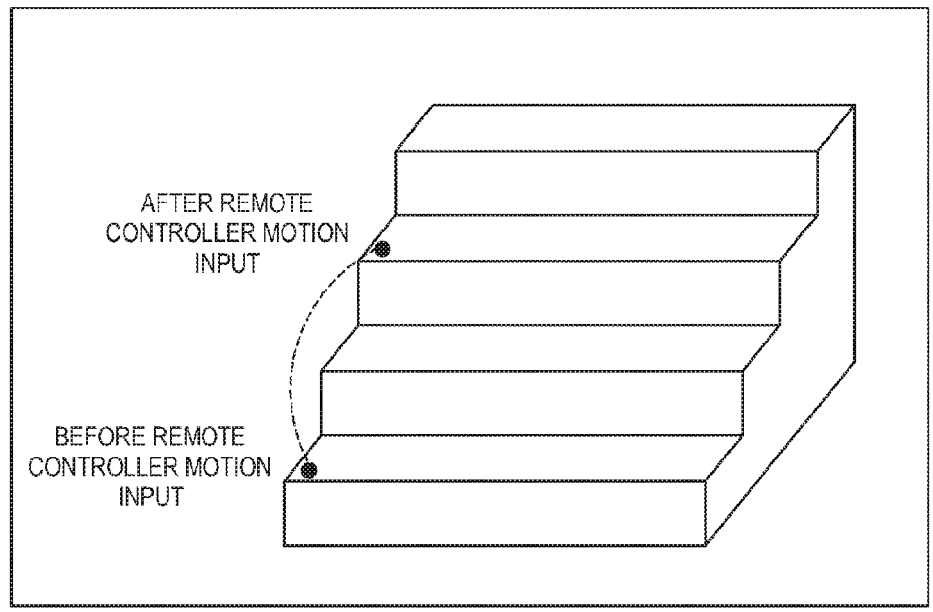
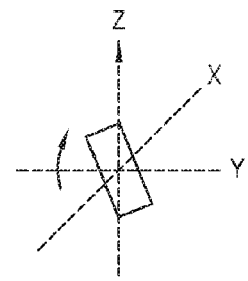

ELECTRONIC APPARATUS, CONTROL METHOD THEREOF, REMOTE CONTROL APPARATUS, AND CONTROL METHOD THEREOF

CROSS-REFERENCE TO RELATED APPLICATION

This application is a continuation of U.S. application Ser. No. 14/637,498 filed Mar. 4, 2015, which is a continuation of U.S. application Ser. No. 14/269,862 filed May 5, 2014 (now U.S. Pat. No. 8,988,271 issued Mar. 24, 2015), which is a continuation of U.S. application Ser. No. 13/769,035 filed Feb. 15, 2013 (now U.S. Pat. No. 8,941,530 issued Jan. 27, 2015), which is continuation of U.S. application Ser. No. 12/694,867 filed Jan. 27, 2010 (now U.S. Pat. No. 8,432,305 issued Apr. 30, 2013), which claims priority from Korean Patent Applications No. 10-2009-0083204, filed Sep. 3, 2009 and No. 10-2009-0123955, filed Dec. 14, 2009, in the Korean Intellectual Property Office, the disclosures of all these listed applications are incorporated herein by reference in their entireties.

BACKGROUND OF THE INVENTION

1. Field of the Invention

Apparatuses and methods consistent with the present invention relate to controlling an electronic apparatus, and more particularly, to an integrated operation remote controller for a digital TV sensing a motion of a user performing a pointing function by moving a cursor displayed on a TV or sensing a motion of the user by adding a motion sensor to an existing button input type remote controller.

2. Description of the Related Art

In a TV, a function such as a channel change, a volume adjustment, etc. is performed by pressing a button on a remote controller. In a conventional TV, a menu with options provided to a user is simple, and only limited services are provided to the user such as viewing broadcast content. However, nowadays, a TV is capable of playing multimedia content or replaying previously broadcast content, providing a game, and furthermore, being connected to an internet to supply various web based services. The TV itself has been developed to perform these various functions, but it is difficult for a user to easily and conveniently use these various services by using a conventional remote controller which has limited functionality and which has been designed to handle conventional TVs.

SUMMARY

Accordingly, it is an aspect of the present disclosure to provide an integrated operation remote controller for a digital TV sensing a motion of a user to perform a pointing function by moving a cursor in a TV or a motion recognizing function by adding a motion sensor to an existing button input type remote controller.

The foregoing and/or other aspects of the present disclosure can be achieved by providing a remote control apparatus which controls an electronic apparatus, the remote control apparatus including: a communication unit which communicates with the electronic apparatus; a user input unit which receives a user button selection; a sensing unit which senses a movement of the remote control apparatus; and a control unit which controls the communication unit to transmit information about the user button selection in case of a button input mode in which a function corresponding to an input button is performed, and to transmit information about the movement of the remote control apparatus to the electronic apparatus in case of a motion recognition mode in which the electronic apparatus is controlled by a movement.

Another aspect of the present disclosure may be achieved by providing an electronic apparatus which is controlled by a remote control apparatus, the electronic apparatus including: an image processing unit which processes an image to display; a communication unit which communicates with the remote control apparatus; and a control unit which operates in a button input mode in which a function corresponding to an input button is performed if the communication unit receives information about a user button selection, and operates in a motion recognition mode in which the electronic apparatus is controlled by a movement if the communication unit receives information about a movement of the remote control apparatus.

Still another aspect of the present disclosure may be achieved by providing a control method of a remote control apparatus, including: receiving a button selection from a user; sensing a movement of the remote control apparatus; and transmitting information about the button selection from the user to an electronic apparatus in case of a button input mode in which a function corresponding to an input button is performed, and transmitting information about a movement of the remote control apparatus to the electronic apparatus in case of a motion recognition mode in which the electronic apparatus is controlled by a movement.

Yet another aspect of the present disclosure may be achieved by providing a control method of an electronic apparatus, including: communicating with a remote control apparatus; receiving at least one of information about a button selection from a user and information about a movement of the remote control apparatus; and operating in a button input mode in which a function corresponding to an input button is performed if information about a button selection from a user is received, and operating in a motion recognition mode in which the electronic apparatus is controlled by a movement if information about a movement of the remote control apparatus is received.

BRIEF DESCRIPTION OF THE DRAWINGS

The above and other aspects of the present disclosure will become apparent and more readily appreciated by describing in detail exemplary embodiments thereof, taken in conjunction with the accompanying drawings, in which:

FIGS. 6A and 6B are views illustrating various types of motion recognition modes embodied by the remote control apparatus and the electronic apparatus according to an exemplary embodiment of the present invention;

DETAILED DESCRIPTION OF EXEMPLARY EMBODIMENTS

Figure 1:
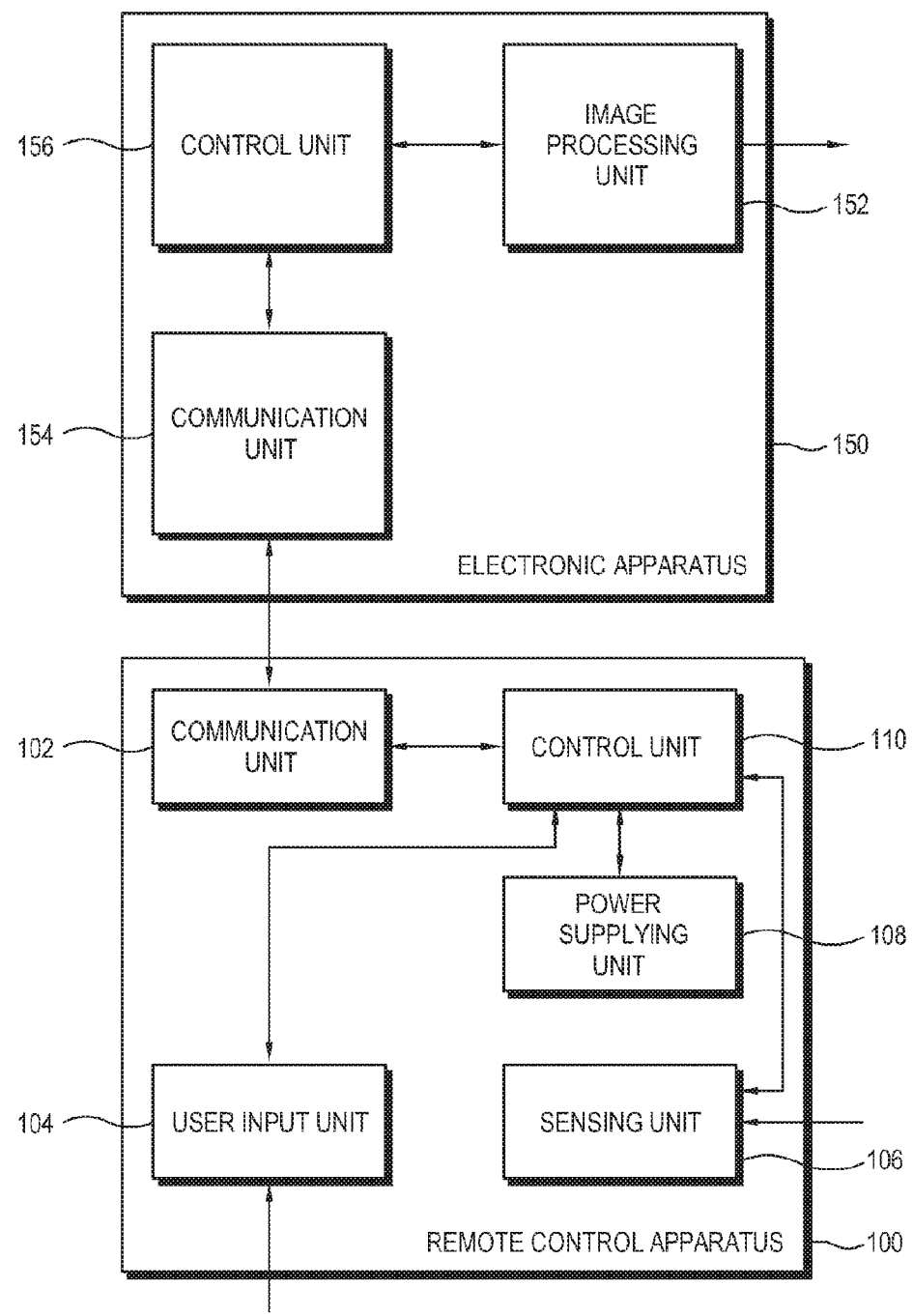
FIG. 1 is a block diagram illustrating a configuration of a remote control apparatus and an electronic apparatus according to an exemplary embodiment of the present invention.

Reference will now be made in detail to exemplary embodiments, examples of which are illustrated in the accompanying drawings, wherein like reference numerals refer to like elements throughout. The exemplary embodiments are described below so as to explain the present invention by referring to the figures. Repetitive description with respect to like elements of different embodiments may be omitted for the convenience of clarity.

FIG. 1 is a block diagram illustrating a configuration of a remote control apparatus and an electronic apparatus according to an exemplary embodiment of the present invention.

A remote control apparatus 100 according to an exemplary embodiment of the present invention may be a remote controller, a mobile terminal, a personal digital assistant (PDA), an input device, a pointing device, etc. Also, as long the control device includes a motion sensor capable of sensing movement of a remote control apparatus 100, and capable of remotely controlling an electronic apparatus 150, the control device may be employed as the remote control apparatus 100.

A conventional remote controller just performs one way communication transmitting a control signal to an electronic apparatus. However, the remote control apparatus 100 according to an exemplary embodiment may support a two way communication providing an interface capable of a two way interaction with a user.

The electronic apparatus 150 according to an exemplary embodiment may be a digital TV, a monitor, a desk top computer, a note book, etc. Also, as long as the device is capable of being controlled by the remote control apparatus 100, the device may be the electronic apparatus 150.

Hereinafter, the exemplary remote control apparatus 100 and the exemplary electronic apparatus 150 will be described in detail.

The remote control apparatus 100 according to an exemplary embodiment may include a communication unit 102, a user input unit 104, a sensing unit 106, a power supplying unit 108 and a control unit 110.

The communication unit 102 may perform a two way communication with the electronic apparatus 150. In detail, the communication unit 102 may perform an infrared ray communication, a bluetooth communication, a local area network (LAN) communication, a zigbee communication, etc. with the electronic apparatus 150.

The user input unit 104 may receive a button selection from a user. The button selection may be an operation of inputting a predetermined key provided on the remote control apparatus 100.

The sensing unit 106 may sense movement of the remote control apparatus 100. For this, the sensing unit 106 may include at least one of a gyro sensor, an acceleration sensor, an angular velocity sensor and a geomagnetic sensor. The above motion sensors may convert a sensed motion into an electric signal. The movement of the remote control apparatus 100 may include a pointing motion to a predetermined area of the electronic apparatus 150 and some other predetermined movement type. Also, the movement of the remote control apparatus 100 may include a three dimensional movement.

The control unit 110 may control an operation and a functional performance of the remote control apparatus 100, and perform an operation processing, etc. therefor. For this, the control unit 110 may include an operation processing block, a memory block, an electric power control block, etc. In this case, the control unit 110 may perform a programmed, control algorithm, stored in each memory block, and executed in the operation processing block.

The control unit 110 may control the communication unit 102 to transmit information about user's button selection to the electronic apparatus 150 in case the remote control is in a button input mode in which a function corresponding to an input button is performed, and to transmit information about a movement of the remote control apparatus 100 to the electronic apparatus 150 in case the remote control is in a motion recognition mode in which the electronic apparatus 150 is controlled by a movement. In detail, the control unit 110 may transmit a packet including a field about user's button selection, or may transmit a packet including a field about movement of the remote control apparatus 100. Exemplary types of the packet will be described later by referring to FIGS. 2A and 2B.

In case of the motion recognition mode, the control unit 110 may control the communication unit 102 to transmit all information about user's button selection and movement of the remote control apparatus 100 to the electronic apparatus 150.

The control unit 110 may control the communication unit 102 to transmit information about an operation mode of the remote control unit 100 together with input in this mode if information about a user's button selection or information about movement of the remote control apparatus 100 is transmitted to the electronic apparatus 150. In detail, the remote control apparatus 100 may have a packet that includes a field about an operation mode of the remote control apparatus 100 in addition to a field about a user's button selection and/or to a field about movement of the remote control apparatus 100.

According to an exemplary embodiment, the control unit 110 may operate in the button input mode or the motion recognition mode depending on information received from the electronic apparatus 150. For example, the control unit 110 may determine the operation mode based on the type of contents received from the electronic apparatus 150. If a user executes a game, the remote control apparatus 100 may operate in the motion recognition mode. Also, by default, while the control unit 110 does not receive information from the electronic apparatus 150, the control unit 110 may operate in the button input mode.

If the remote control apparatus 100 according to an exemplary embodiment operates in the motion recognition mode, electric power is constantly supplied from a power source that is maintained in an active state to a motion sensor such as a gyro sensor, an acceleration sensor, etc. for recognizing a pointing location or sensing a movement. Accordingly, since the power consumption of a battery increases, battery's usage time is reduced in comparison to operating the remote control in a button only mode.

To solve this problem, if a user controls a TV by only using buttons of a remote controller, in an exemplary embodiment, the remote control senses this and automatically converts the state of a motion sensor into a power save mode. Also, only in case of using a pointing recognition function or a motion recognition function, the electric power is supplied to the motion sensor by a source which is converted into a power active state, thereby minimizing the power consumption of the battery.

For this, the remote control apparatus 100 may include the power supplying unit (source) 108 supplying an electric power to the sensing unit 106.

The control unit 110 may control the power supplying unit 108 to block electric power supplied to the sensing unit 106 i.e. changing the sensing unit 106 into a power saving state if the remote control apparatus 100 is in a button input mode. In this case, the control unit 110 may determine which mode to operate in (the button input mode or the motion recognition mode) depending on at least one of a function and a property of an application executed by the electronic apparatus 150.

Even in case the remote control apparatus 100 operates in the motion recognition mode, the control unit 110 may control the power supplying unit 108 to switch to the power saving state if movement of the remote control apparatus 100 is not sensed during a predetermined time period.

Alternatively, the sensing unit 106 may sense movement of the remote control apparatus 100 in a sleep state. In case of the sleep state, the control unit 110 may control the power supplying unit 108 to supply a minimum electric power of a predetermined level to the sensing unit 106 just for sensing movement. In this case, the control unit 110 manages the electric power with the following operations.

At first, operating in the motion recognition mode, the control unit 110 controls the power supplying unit 108 to switch to the sleep state if movement of the remote control apparatus 100 is not sensed during a predetermined time.

Then, in the sleep state, the control unit 110 controls the power supplying unit 108 to switch to the power saving state if movement of the remote control apparatus 100 is not sensed during another predetermined time period.

In the sleep state, the control unit 110 may also control the power supplying unit 108 to switch to a power active state in which an electric power is supplied to the sensing unit 106 if movement of the remote control apparatus 100 is sensed.

The electronic apparatus 150 according to an exemplary embodiment may include an image processing unit 152, a communication unit 154 and a control unit 156.

The image processing unit 152 may process and display an image. In this case, the image processing unit 152 may include a display panel embodied by a liquid crystal display (LCD), an organic light emitting diode (OLED), a plasma display panel (PDP), etc.

The communication unit 154 may perform a two way communication with the remote control apparatus 100. In detail, the communication unit 154 may perform an infrared ray communication, a bluetooth communication, a local area network (LAN) communication, a zigbee communication, etc. with the remote control apparatus 100.

If the communication unit 154 receives information about a user's button selection, the control unit 156 may operate in a button input mode performing a function corresponding to the input button. Also, if the communication unit 154 receives information about movement of the remote control apparatus 100, the control unit 156 may operate in a motion recognition mode controlling the electronic apparatus 150 by using the received movement.

The movement of the remote control apparatus 100 may include a three dimensional movement.

If the electronic apparatus 150 is turned on, the control unit 156 may control the communication unit 154 to transmit to the remote control apparatus 100 information about at least one of a function, an application and content which the electronic apparatus 150 is currently executing.

If information about a user's button selection or information about movement of the remote control apparatus 100 is received, the control unit 156 may also receive information about an operation mode of the remote control unit 100. In this case, the control unit 156 may operate in the button input mode or the motion recognition mode by referring to the received information about the operation mode of the remote control apparatus 100.

The control unit 156 may control the image processing unit 152 to display a pointing cursor in case the remote control apparatus 100 operates in the motion recognition mode.

Figure 2A:
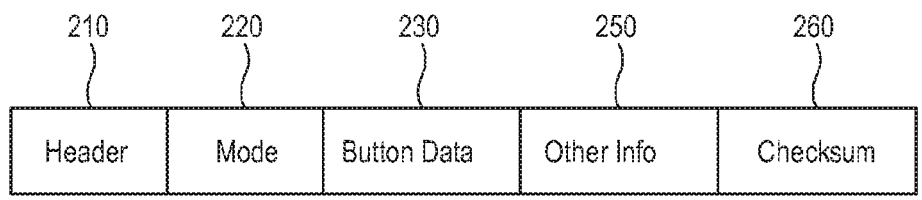
FIG. 2A is a diagram illustrating a configuration of a transmitted packet if the remote control apparatus operates in a button input mode according to an exemplary embodiment of the present invention.
Figure 2B:
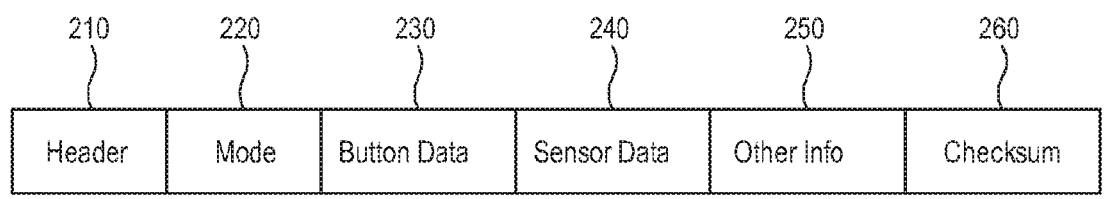
FIG. 2B is a diagram illustrating a configuration of a transmitted packet if the remote control apparatus operates in a motion recognition mode according to an exemplary embodiment of the present invention.

FIG. 2A is a diagram illustrating a configuration of a transmitted packet if the remote control apparatus operates in the button input mode according to an exemplary embodiment, and FIG. 2B is a diagram illustrating a configuration of a transmitted packet if the remote control apparatus operates in the motion recognition mode according to an exemplary embodiment.

A header field 210 informs of the start of the transmission signal.

A mode field 220 discerns the mode of the remote control apparatus 100. In detail, the mode field 220 includes data discerning whether the remote control apparatus is in the button input mode and the motion recognition mode.

A button data field 230 provides information about a user's button selection. For example, information about which button was pressed may be provided.

A sensor data field 240 provides information about a sensed movement of the remote control apparatus 100 as shown in FIG. 2B.

Another info field 250 provides other data necessary for a remote control, and a checksum field 260 includes data confirming whether a transmission was successful.

If the remote control apparatus 100 operates in the button input mode, the remote control apparatus 100 may transmit information about a user's button selection to the electronic apparatus 150. In this case, information about movement of the remote control apparatus 100 is not transmitted. Referring to FIG. 2A, in this case, only the button data field 230 is included in a transmitted packet, and there is no sensor data field 240.

If the remote control apparatus 100 operates in the motion recognition mode, the remote control apparatus 100 may transmit information about movement of the remote control apparatus 100 to the electronic apparatus 150. Furthermore, the remote control apparatus 100 may also transmit information about a user's button selection and information about movement of the remote control apparatus 100 to the electronic apparatus 150. Referring to FIG. 2B, in this case, both the button data field 230 and the sensor data field 240 are provided in a transmitted packet.

Figure 3:
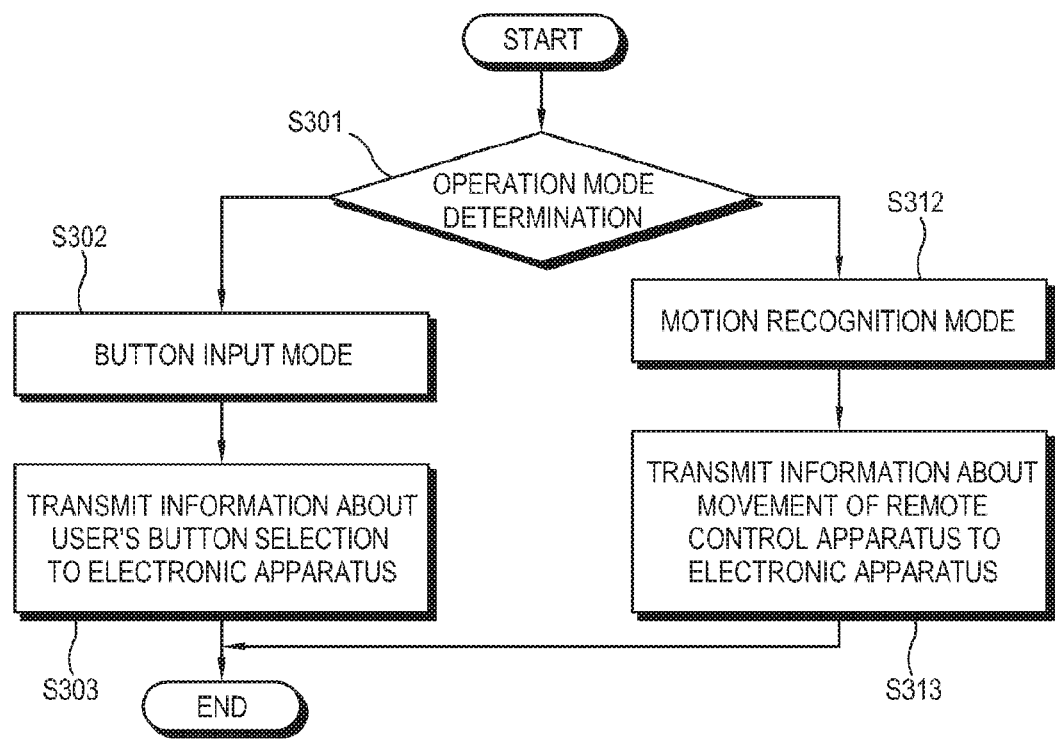
FIG. 3 is a flow chart illustrating a control process of the remote control apparatus according to an exemplary embodiment of the present invention.

FIG. 3 is a flow chart illustrating a control process of the remote control apparatus according to an exemplary embodiment.

The remote control apparatus 100 determines an operation mode (S301).

According to an exemplary embodiment, the remote control apparatus 100 may operate in a button input mode or a motion recognition mode depending on information received from the electronic apparatus 150. That is, the operation mode of the remote control apparatus 100 may be determined by the information received from the electronic apparatus 150, and may basically operate in the button input mode if no information is received. In detail, the remote control apparatus 100 may determine whether to operate in the button input mode or the motion recognition mode depending on at least one of a function, a property of an application and a type of contents which the electronic apparatus 150 executes.

Alternatively, the electronic apparatus 150 may determine the button input mode or the motion recognition mode depending on a menu of the electronic apparatus 150, and may transmit information thereabout to the remote control apparatus 100.

The remote control apparatus 100 receives a user's button selection, or senses movement of the remote control apparatus 100. The remote control apparatus 100 may perform both operations.

In case of the button input mode (S302), the remote control apparatus 100 transmits information about the user's button selection to the electronic apparatus 150 (S303). In detail, the remote control apparatus 100 may transmit a packet which includes the button data field 230 providing information about the user's button selection.

In case of the motion recognition mode (S312), the remote control apparatus 100 transmits information about movement of the remote control apparatus 100 (S313). In detail, the remote control apparatus 100 may transmit a packet which includes the sensor data field 240 providing information about the movement of the remote control apparatus 100.

Figure 4:
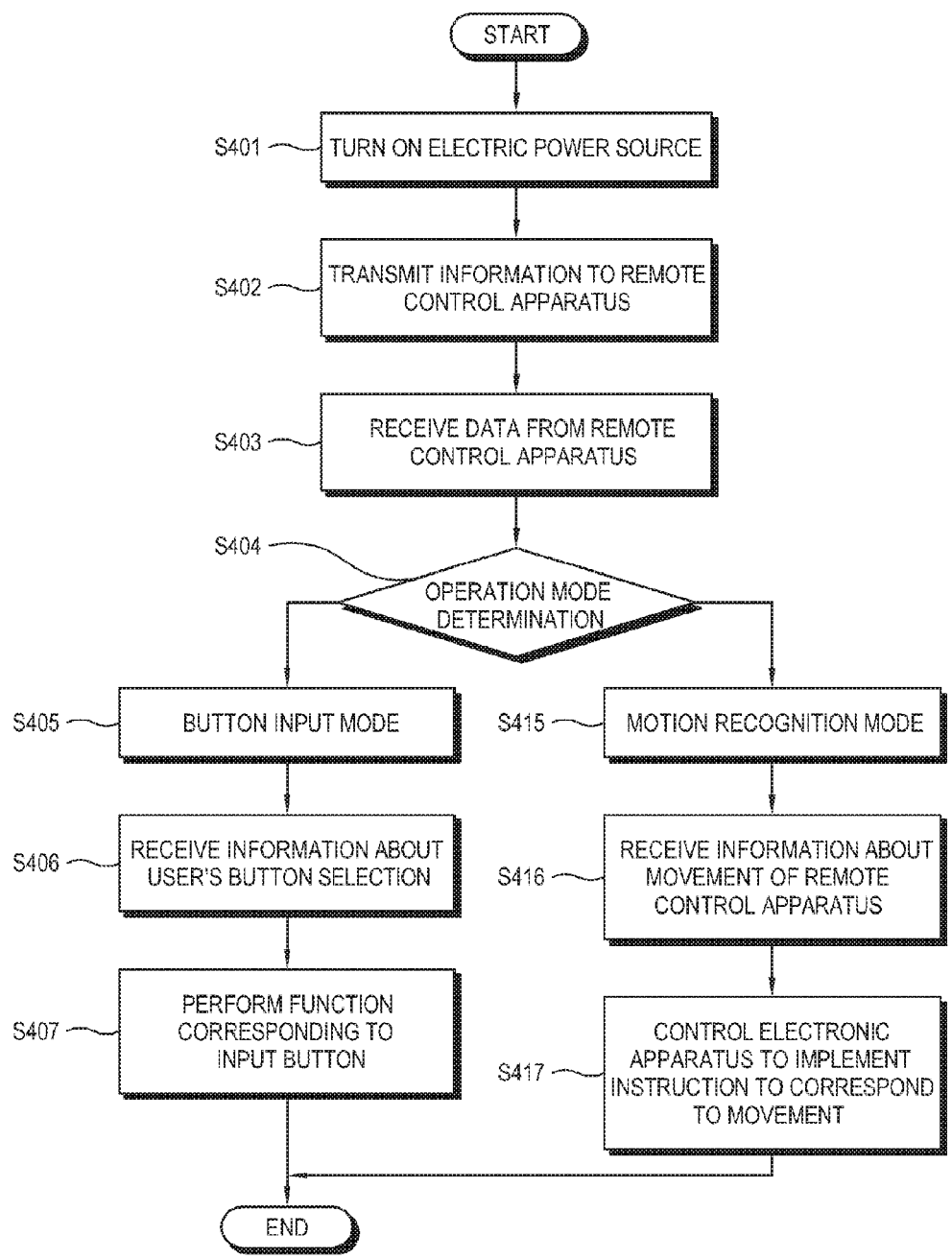
FIG. 4 is a flow chart illustrating a control process of the electronic apparatus according to an exemplary embodiment of the present invention.

FIG. 4 is a flow chart illustrating a control process of the electronic apparatus according to an exemplary embodiment.

The electric power source of the electronic apparatus 150 is turned on (S401). In detail, a user may turn on the electric power source of the electronic apparatus 150 with a remote controller apparatus 100. According to an exemplary embodiment, the electronic apparatus 150 may be set to operate in the button input mode when the electric power source is turned off.

When the electronic power source is turned on, the electronic apparatus 150 transmits information to the remote control apparatus 100 (S402). In detail, the electronic apparatus 150 may transmit information about at least one of a function, an application and a content which the electronic apparatus 150 is currently executing to the remote control apparatus 100. Based on the information, the remote control apparatus 100 may determine whether to operate in the button input mode or the motion recognition mode.

Alternatively, in the electronic apparatus 150, an operation mode may be determined depending on a menu of the electronic apparatus 150, and information about the determined operation mode may be transmitted to the remote control apparatus 100.

The electronic apparatus 150 receives data from the remote control apparatus 100 (S403).

In this case, the electronic apparatus 150 determines an operation mode (S404). In detail, the mode field 220 in the received data provides mode information to the remote control apparatus 100.

In case of the button input mode (S405), the electronic apparatus 150 receives information about a the user's button selection (S406). In this case, the electronic apparatus 150 performs a function corresponding to the input button (S407). In detail, an operation by an input button signal may be performed in the application.

In case of the motion recognition mode (S415), the electronic apparatus 150 receives information about movement of the remote control apparatus 100 (S416). In this case, the electronic apparatus 150 controls the electronic apparatus 150 to implement instructions corresponding to the movement (S417). In detail, an operation result of pointing coordinate and motion may be generated out of the sensed movement, and various controls with respect to the application may be performed by using this operation result.

Furthermore, the electronic apparatus 150 may display a pointer or a pointing cursor in the application.

Figure 5:
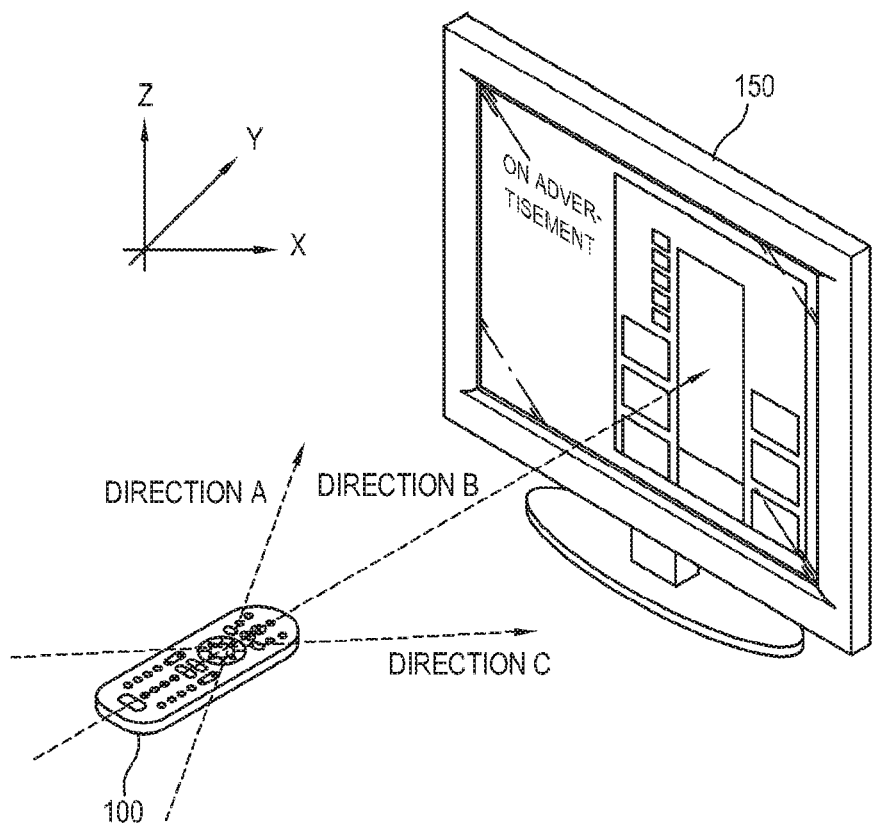
FIG. 5 is a view illustrating a schematic type embodied by the remote control apparatus and the electronic apparatus according to an exemplary embodiment of the present invention.

FIG. 5 is a view illustrating a schematic type embodied by the remote control apparatus and the electronic apparatus according to an exemplary embodiment.

A user accesses a menu that accepts selection of an item on the TV via a pointing function implemented using an integrated operation remote controller. In this case, if the user moves the remote controller up and down and right and left, the remote controller senses user's movement with a motion sensor. The remote controller converts a sensed signal into a position coordinate through a pointing algorithm, and the position coordinate is displayed on the TV.

Referring to FIG. 5, the electronic apparatus 150 concurrently displays a broadcasting screen and a game application. A user may operate the remote control apparatus 100 in the motion recognition mode to perform the game application. For example, if the user moves the remote control apparatus 100 in a direction a, a pointer moves in a vertical direction on a three-dimension, and if the user moves the remote control apparatus 100 in a direction b, the pointer moves in a direction of axis Y on a two-dimensional plane, and if the user moves the remote control apparatus 100 in a direction c, the pointer moves in a direction of axis X on a two-dimensional plane.

Depending on a user's selection, it is possible to operate the remote control apparatus 100 in the motion recognition mode to control a general function of the TV. For example, it is possible to vary a channel moving degree depending on a moving angle of the remote control apparatus 100 in the vertical direction. Where a degree of a moving angle after the remote control apparatus 100 is moved vertically is 30 degrees, the TV is moved vertically by two channels. Where a degree of a moving angle after the remote control apparatus 100 is 60 degrees, the TV can be moved vertically by four channels.

When a user intends to use the TV in a conventional way i.e., by performing the general function, the remote controller may perform a button input function. For example, if the user switches to view a broadcasting by using the remote control apparatus 100, the remote control apparatus 100 may switch to a next channel up by using a channel up key.

The electronic apparatus 150 controlled by the remote control apparatus 100 may perform a function corresponding to an input button, or may control the electronic apparatus 150 to correspond to a movement of the remote control.

In case of selecting a menu displayed on a TV or performing a game by using a button type remote controller, a user moves to a wanted spot by using a four direction key. In this case, since only gradual movement is possible, it is impossible to move to a wanted spot at once like using a mouse in a personal computer. Also, since the same infrared (IR) signal is transmitted several times for a stable input of a key, it is inappropriate to perform an application such as a game, etc. because an input speed of a key is slow.

According to an exemplary embodiment, in this case, the remote control apparatus 100 operates in the motion recognition mode, thereby embodying a user interface (UI) appropriate to the property of the application.

Figure 6A:
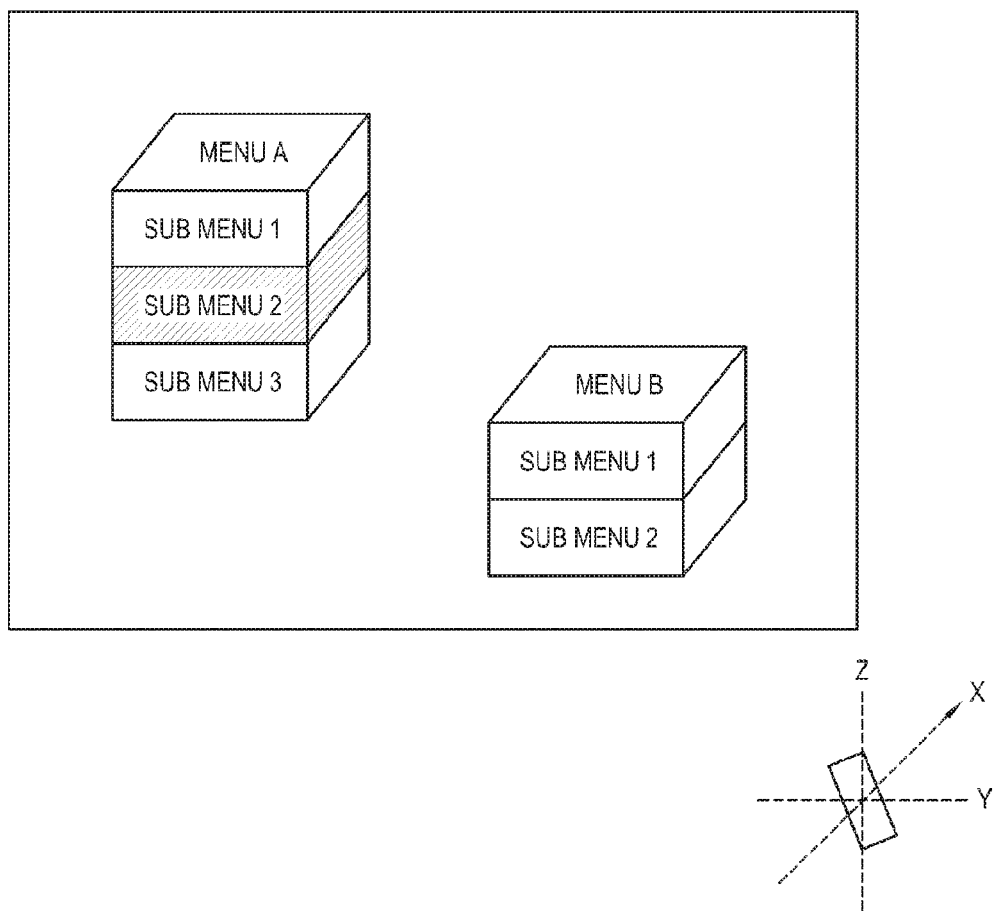

FIGS. 6A and 6B are views illustrating various types of menus for motion recognition mode embodied by the remote control apparatus and the electronic apparatus according to an exemplary embodiment.

In an exemplary embodiment, a three-dimensional movement may be sensed by using a remote controller including a motion sensor, and information about this movement may be transmitted to a TV. Accordingly, a multi media content of a UI, a game, etc. of a three-dimensional type displayed in the TV can be controlled.

Referring to FIG. 6A, a three-dimensional menu type is displayed on a TV screen. In this case, a user may control a three-dimensional type of UI by moving the remote controller on a two-dimensional plane or a three-dimensional plane. For example, a user may move the remote controller on a two-dimensional plane to select a menu A or a menu B. Also, a user may move the remote controller up and down on a three-dimensional plane to select a sub menu 1, a sub menu 2, etc. belonging to the menu A or a menu B.

Referring to FIG. 6B, a game screen is displayed on a TV screen. In this case, a user may control a three-dimensional type game application by moving the remote controller on a two-dimensional plane or a three-dimensional plane. For example, a user may move the remote controller up and down on a three-dimensional plane to raise or lower the position of a ball on a step by a step basis. A user may move the remote controller right and left on a two-dimensional plane to move the ball right and left on the same step.

As described above, according to FIGS. 6A and 6B, movement of a remote controller on a three-dimensional plane is sensed to precisely control a UI or a three-dimensional type of content.

Figure 7A:
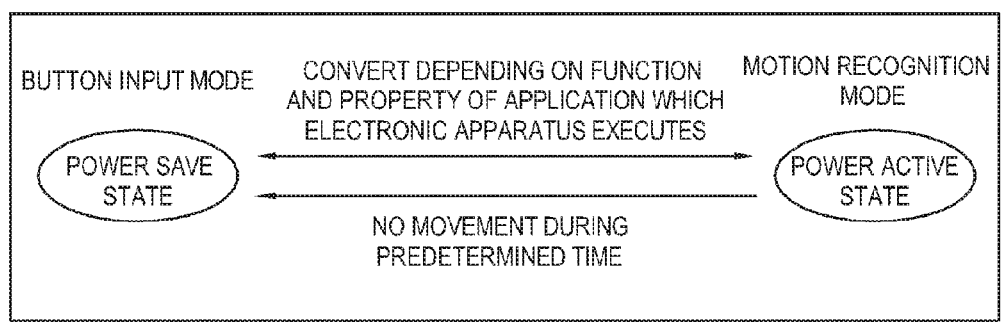
FIGS. 7A and 7B are diagrams illustrating a schematic control process of a remote control apparatus according to an exemplary embodiment of the present invention.
Figure 7B:
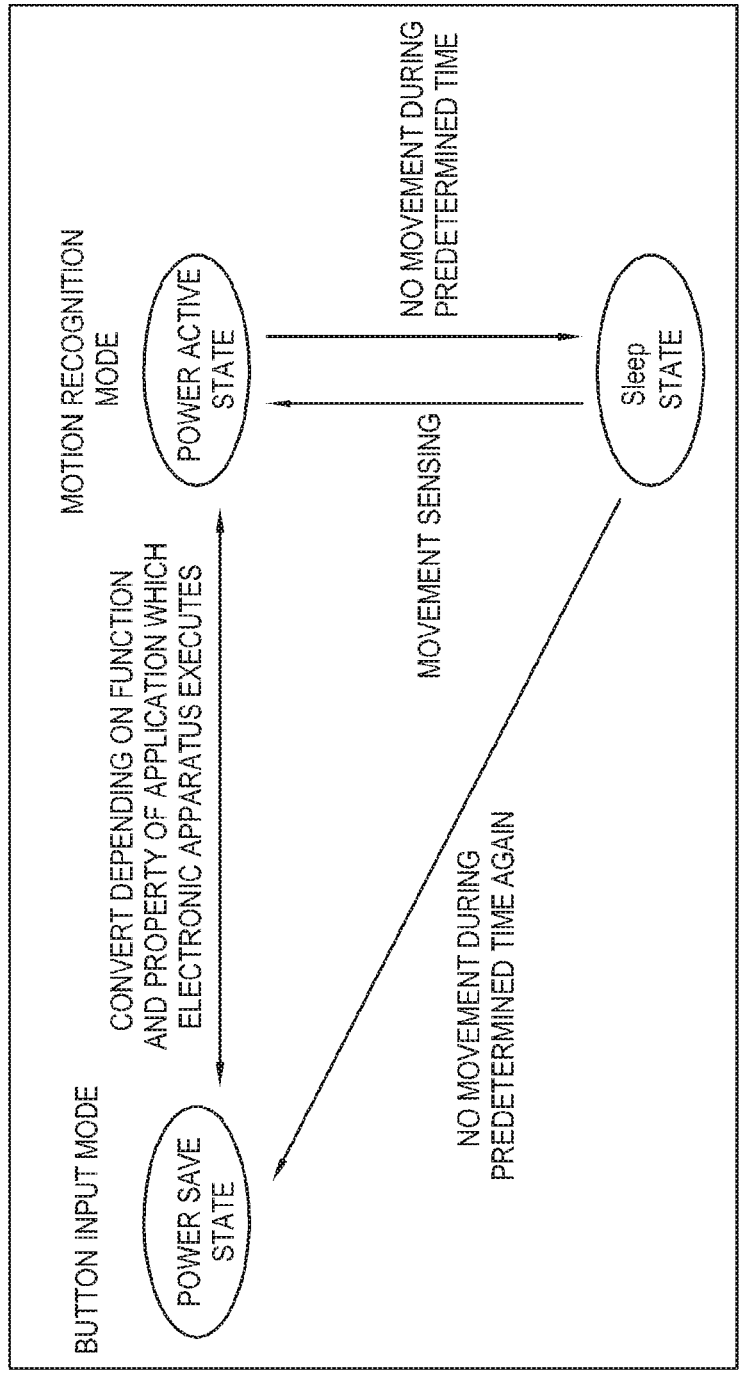

FIGS. 7A and 7B are diagrams illustrating a schematic control process of a remote control apparatus according to an exemplary embodiment.

FIG. 7A is a diagram illustrating the case of using a general motion sensor according to an exemplary embodiment.

In case of operating in a button input mode, the remote control apparatus 100 is switched to a power save state. In detail, an electric power supplied to the sensing unit 106 is blocked to switch the remote control apparatus 100 to the power save state. Also, just button data is transmitted, as information, to the electronic apparatus 150, thereby minimizing power consumption.

In case of operating in a motion recognition mode, the remote control apparatus 100 is switched to a power active state. Also, button data and data about a sensed movement are all included in information transmitted to the electronic apparatus 150. The remote control apparatus 100 is switched to the power save state if there is no movement of the remote control apparatus 100 during a predetermined time period when it operates in the motion recognition mode.

Furthermore, the remote control apparatus 100 may be reciprocally switched to the power save state or the power active state depending on a function and a property of application being executed by the electronic apparatus 150.

FIG. 7B is a diagram illustrating the case of using a motion sensor capable of sensing motion in a sleep state where minimum electric power is consumed according to an exemplary embodiment.

Recently, owing to development of a micro-electromechanical system (MEMS) technology, a motion sensor capable of sensing movement in a state of consuming minimum electric power (that is, a sleep state) for performing a specific function has been released. By using this motion sensor, movement can be sensed in the sleep state which consumes a minimum current.

In case of operating in a button input mode, the remote control apparatus 100 is switched to a power save state, or maintains the power save state.

In case of operating in a motion recognition mode, the remote control apparatus 100 is switched to a power active state, or maintains the power active state. If there is no movement during a predetermined time, the remote control apparatus 100 is switched to the sleep state. In detail, only minimum electric power to sense a movement may be supplied to the sensing unit 106. If then there is no movement during a predetermined time in the sleep state, the remote control apparatus 100 is switched to the power save state. If movement is sensed in the sleep state, the remote control apparatus 100 may be switched to the power active state. For example, if a user grasps a remote controller or moves in a specific direction, the power active mode is entered to perform the function indicated by the remote controller.

For this, the sensing unit 106 may monitor user's movement or the movement of the remote control unit 100 for a specific period of time.

According to an exemplary embodiment illustrated in FIG. 7B, if there is no movement during a predetermined period of time when the remote control apparatus 100 operates in the motion recognition mode, the remote control apparatus 100 is switched to the sleep state or the power save state. Also, in case of the sleep state, the remote control apparatus 100 supplies to the motion sensor only minimum electric power required for sensing a movement. Accordingly, the power consumption can be minimized, and an efficient electric power management can be performed.

Figure 8:
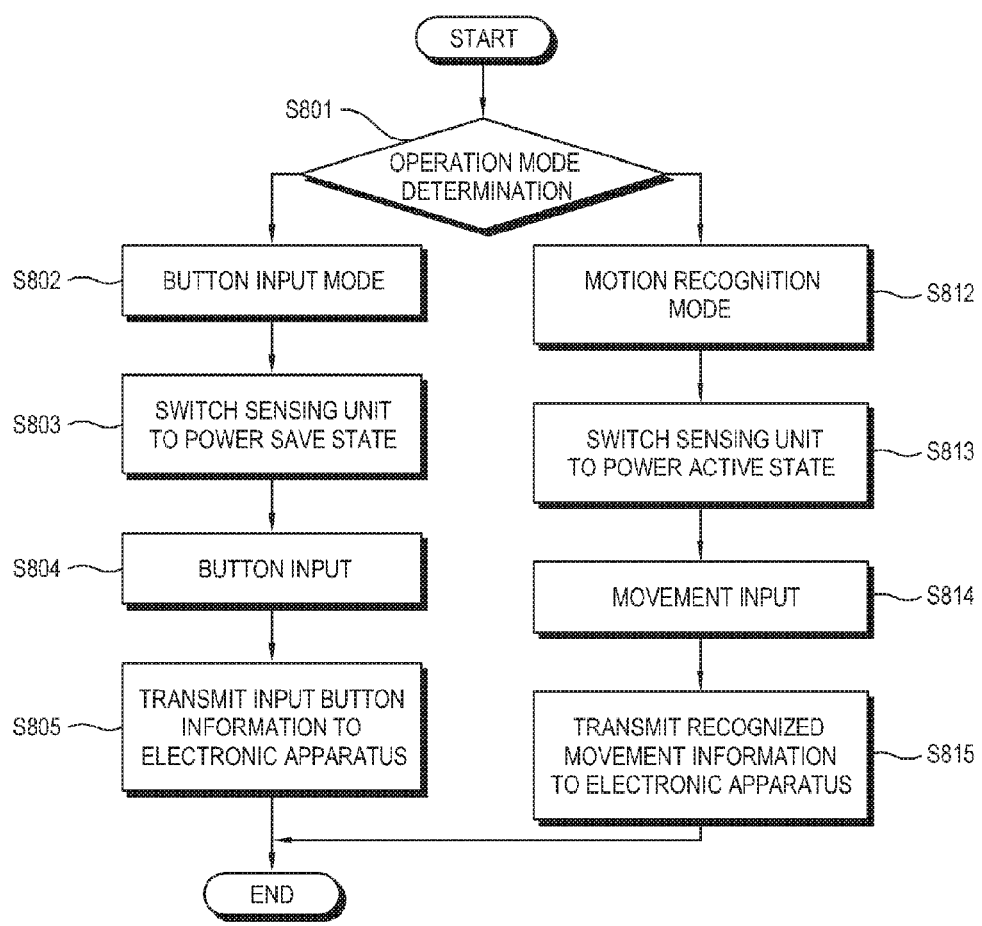
FIG. 8 is a flow chart illustrating a control process of a remote control apparatus according to an exemplary embodiment of the present invention.

FIG. 8 is a flow chart illustrating a control process of a remote control apparatus according to an exemplary embodiment.

The remote control apparatus 100 determines an operation mode (S801). According to an exemplary embodiment, the remote control apparatus 100 may determine the operation mode based on information received from the electronic apparatus 150. In detail, the remote control apparatus 100 may determine which mode to operate in i.e., a button input mode or a motion recognition mode, based on information about at least one of a function, an application and content executed by the electronic apparatus 150.

In case of operating in the button input mode (S802), the remote control apparatus 100 maintains the sensing unit 106 in a power save state, or switches to the power save state (S803). Also, only information provided by the button input is transmitted to the electronic apparatus 150. In this case, if a user inputs a button (S804), the remote control apparatus 100 transmits the input button information to the electronic apparatus 150 (S805).

In case of the motion recognition mode (S812), the remote control apparatus 100 maintains or switches the sensing unit 106 to a power active state (S813). Also, all of the button information and the movement information may be transmitted to the electronic apparatus 150. In this case, if a user inputs a movement (S814), the remote control apparatus 100 transmits the recognized movement information to the electronic apparatus 150 (S815).

Also, when transmitting the button information and/or the movement information to the electronic apparatus 150, the remote control apparatus 100 may also transmit a mode information indicating which of the two modes is currently being used.

As described above, according to an exemplary embodiment, pointing input and motion input are performed by using a remote controller, thereby easily controlling a game or multimedia content, and furthermore, providing a new and entertaining experience to a user.

Also, a state of a motion sensor provided to a remote controller is reciprocally switched to a power save/active state and a sleep state, thereby performing an intelligent power management without a separate control by a user to extend the usage time of a battery.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. An electronic system comprising:
   a first electronic apparatus comprising:
      a plurality of buttons comprising a plurality of direction keys;
      a sensing unit operable in one of an active mode and a power saving mode, configured to sense a movement of the first electronic apparatus, the sensing unit comprising at least one from among a gyro sensor, an acceleration sensor, and a geomagnetic sensor;
      a first communication unit configured to establish communication with a second electronic apparatus; and
      a first control unit configured to transmit information corresponding to the movement of the first electronic apparatus which is sensed by the sensing unit in the active mode, the information being transmitted to the second electronic apparatus via the first communication unit, and
   the second electronic apparatus comprising:
      a display;
      a second communication unit configured to establish communication with the first electronic apparatus; and
      a second control unit configured, in response to a first user command to execute a predefined application among a plurality of applications which are provided by the second electronic apparatus, to transmit a control signal via the second communication unit to the first electronic apparatus so that the sensing unit operates in the power saving mode, and to control the executed application according to a second user command received from the first electronic apparatus via the second communication unit,
   wherein the sensing unit consumes less power in the power saving mode than in the active mode.

2. The electronic system according to claim 1, wherein the first control unit is configured to control the sensing unit to operate in the power saving mode in response to detecting a predefined user input via the plurality of direction keys.

3. The electronic system according to claim 1, wherein when the sensing unit operates in the power saving mode, the sensing unit consumes a minimum electric power.

4. The electronic system according to claim 1, wherein the control signal corresponds to the executed application in the second electronic apparatus.

5. The electronic system according to claim 1, wherein the control signal comprises information for switching the operation mode of the sensing unit between the active mode and the power saving mode.

6. The electronic system according to claim 1, wherein the second user command corresponds to a user button input received on the first electronic apparatus.

7. The electronic system according to claim 1, wherein in response to the first user command, the second control unit is configured to control to operate in a non-pointing mode in which the second control unit controls the second electronic apparatus according to a user button selection on the first electronic apparatus, and in response to receiving information related to movement of the first electronic control apparatus while the second control unit operates in the non-pointing mode, the second control unit is further configured to switch from the non-pointing mode to a pointing mode in which the second control unit controls the display to display a pointer on the display.

8. The electronic system according to claim 7, wherein the second control unit controls not to display the pointer in the non-pointing mode.

9. The electronic system according to claim 7, wherein the operation mode of the second electronic apparatus is switched from the pointing mode to the non-pointing mode in response to a user manipulation with respect to the second electronic apparatus.

10. The electronic system according to claim 7, wherein the operation mode of the second electronic apparatus is switched from the pointing mode to the non-pointing mode in response to a signal indicating a button selected by a user input.

11. The electronic system according to claim 7, wherein when the second electronic apparatus operates in the non-pointing mode, the second control unit controls a user-indicated spot in the display based on a user input with respect to the plurality of direction keys.

12. A display apparatus comprising:
   a display;
   a communication unit configured to establish communication with a remote control apparatus having a sensing unit operable in one of an active mode and a power saving mode, the sensing unit comprising at least one of a gyro sensor, an acceleration sensor, and a geomagnetic sensor; and
   a control unit configured, in response to a first user command to execute a predefined application among a plurality of applications which are provided by the display apparatus, to transmit a control signal via the communication unit to the remote control apparatus so that the sensing unit operates in the power saving mode and to control the executed application according to a second user command received from the remote control apparatus via the communication unit,
   wherein the sensing unit consumes less power in the power saving mode than in the active mode.

13. The display apparatus according to claim 12, wherein the control signal corresponds to the executed application in the display apparatus.

14. The display apparatus according to claim 12, wherein the control signal comprises information for switching the operation mode of the sensing unit between the active mode and the power saving mode.

15. The display apparatus according to claim 12, wherein the second user command corresponds to a user button input received on the remote control apparatus.

16. The display apparatus according to claim 12, wherein in response to the first user command, the control unit is configured to control to operate in a non-pointing mode in which the control unit controls the display apparatus according to a user button selection on the remote control apparatus, and in response to receiving information related to movement of the remote control apparatus while the control unit operates in the non-pointing mode, the control unit is further configured to switch from the non-pointing mode to a pointing mode in which the control unit controls the display to display a pointer on the display.

17. The display apparatus according to claim 16, wherein the control unit controls not to display the pointer in the non-pointing mode.

18. The display apparatus according to claim 16, wherein the operation mode of the display apparatus is switched from the pointing mode to the non-pointing mode in response to a user manipulation with respect to the display apparatus.

19. The display apparatus according to claim 16, wherein the operation mode of the display apparatus is switched from the pointing mode to the non-pointing mode in response to a signal indicating a button selected by a user input.

20. The display apparatus according to claim 16, wherein when display apparatus operates in the non-pointing mode, the control unit controls a user-indicated spot in the display based on a user input with respect to the plurality of direction keys.

* * * * *